UNITED STATES PATENT OFFICE 2,337,562

PRODUCTION OF STABILIZING AGENTS

Albert A. Lund, Port Washington, N. Y., assignor to Jacques Wolf & Co., Passaic, N. J., a corporation of New Jersey No Drawing. Application April 24, 1940,
Serial No. 331,485

7 Claims. (Cl. 260—210)

This invention relates to the production of jellying and stabilizing agents from various species of seaweed or vegetable sea growth.

The invention has for its principal objects the provision of a process of isolating in a substantially pure and concentrated form the colloidal ethereal salt complex of sea moss and other marine plants in which the gelatinizing agent occurs in a similar form and a process which is adapted for practice on a low cost large commercial scale.

As illustrative of the principles of the invention, the isolation or purification of the active colloid principle of *Chondrus crispus* (Ireland or Irish moss) is herein described particularly, although it is to be understood that the process is also applicable to kindred marine sources, as for example, kelp.

The active colloidal or gelatinizing principle of *Chondrus crispus* is an ethereal sulfate of calcium (calcium carragheen sulfate) represented by the probable formula:

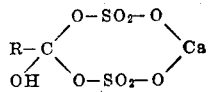

in which the ester R is a very long chain molecular compound capable of splitting into progressively smaller units of reduced viscosity and jellying power in a manner analogous to the dextrins.

In the presence of heat and water, the ethereal salt complex readily hydrolyzes forming calcium sulfate, sulfuric acid and a postulated unstable intermediate compound which splits off water to form the corresponding carragheenic acid or lactone:

(1) 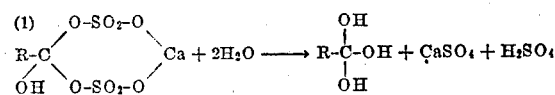

(2) 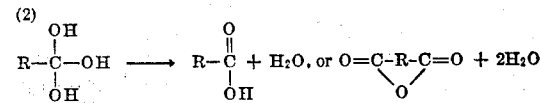

Free salts, chiefly chlorides from sea water and acids acting as catalysts, exert a further powerful hydrolyzing and dissociating influence on the material with commensurate instability and lack of uniformity in the final so-called "purified" products resulting.

Thus, it would appear that the crude and imperfectly purified products found in commerce are in fact very heterogeneous mixtures comprising, in addition to the active colloid complex, its less efficient constituent carragheenic acid and that substance's cleavage products together with varying amounts of free salts, mineral acid, fibrous celluloses, hemicelluloses, and the various coloring matters and aromatic impurities associated with the marine or natural plant source from which the material is derived. Any process designed to isolate or recover the colloid salt complex in a substantially pure state, without chemical alteration, must take into account the presence of all of these substances and effectively remove them from the system.

Heretofore, efforts to produce a suitably refined product have revolved around two general methods, one, washing the dried crude or chopped moss and the other, precipitating a filtered weak aqueous extract of the moss with alcohol. The washing method, practiced with a preponderantly alcoholic aqueous solution, may involve a limited soaking and swelling of the moss particles to facilitate removal of adherent surface salts and the extraction by the alcohol of the objectionable coloring and aromatic matters of the plant which are largely alcohol soluble. It is obvious that this treatment does not remove the fibrous and other inert matter of the plant, and since no matter how often the washing and subsequent drying steps are repeated, a fresh layer of chlorides will be found to form on the surfaces of the particles after each drying, the treatment only partially removes the salt content. Further, the washing method is incapable of effecting any appreciable separation of the hydrolytic and dissociation products of the complex from the system. Consequently, the impure product which results tends to be un-uniform, unstable, and of impoverished jellying power commensurate with its viscosity.

On the other hand, the alcoholic precipitation process, which may produce a considerably more refined product, is objected to on the ground that it is exceedingly costly, requiring approximately seventy parts of alcohol to recover one part of the dried extract, as compared with from four to six parts of alcohol according to the present invention.

It is the essence of my discovery that carragheenic acid and its cleavage products are substantially soluble in cold water whereas the salt complex is not; that the free salts and other impurities associated with the complex are freely dialyzable from the material in weak alcoholic solutions but not in the strong alcoholic solutions conventionally employed for soaking and washing; that dialysis proceeds freely only after the particles of the material have become fully hydrated; that separation of hydrolytic and cleavage impurities may be controlled by regulating the salt content and osmotic pressure of the solution; and that once the salt and other impurities of the moss have been removed, the product may safely be heated, dissolved, filtered and dried without any appreciable impairment of the active principle.

As a first step in my process, I may remove chaff, stems and other buoyant impurities, dissolve out much chlorophyll and odoriferous matters, wash adherent surface salts from the moss particles and condition the particles for their subsequent hydration. For example, 300 lbs. of heated 90 percent isopropanol solution may be introduced into a mixing tank provided with a slow means of agitation and with the agitator in motion, 100 lbs. of chopped sea moss may be fed into the solution. After only a few minutes of mixing to float any chaff or stems which may be present, the contents of the tank may be permitted to stand briefly until settling occurs and a strongly colored solution results, whereupon the wash liquor may be decanted or siphoned off as completely as possible and the alcoholic solution purified by activated char filtration and cooled for re-use in the next step.

To the washed moss particles may then be added sufficient cold isopropanol and neutral unheated (preferably distilled) water to bring the system up to 300 parts alcohol and 700 parts water to 100 parts sea moss solids at approximately room temperature. After effecting uniform distribution, the mixture may be permitted to stand for about fifteen hours with an occasional gentle stirring and with the tank covered to limit alcohol evaporation. In this extended lixiviation step a series of complicated actions take place which appear to be as follows: any surface salts remaining on the chopped moss particles are dissolved off by the solution causing an immediate increase in the solids content of the solution, the peak being reached in about thirty minutes; concurrently with the foregoing action, water is selectively imbibed by the particles in performance of the functions of hydration usually completed in about one hour, this abstraction of the water from the solution resulting in an increase in the alcoholic concentration of the solution since alcohol is an anhydriding agent and cannot be utilized by the colloid for hydration; a dialysis system having been set up, with the outer surface of the particles serving as a semi-permeable membrane, the alcohol of the solution is free to diffuse through the membrane to establish osmotic equilibrium; and free salts contained within the particle envelope dialyze out until a salt equilibrium is established on both sides of the membrane, the action ordinarily requiring some fifteen to twenty hours for substantial completion and during which there is a continual leaching out of soluble carbohydrate constituents, principally cleavage products of carragheenic acid.

The alcoholic concentration of the aqueous treating solution in the above lixiviation step should be adjusted to between 15 and about 40%, preferably about 30%, within which range a complete hydration of the particles may be effected. At higher concentrations the alcohol tends to block all further action except the extraction of substances such as coloring and aromatic matters which may be alcohol-soluble. Instead of isopropanol, methyl or ethyl alcohol may be used or any water-miscible lower chain alcohol or mixture thereof including acetone, methyl acetate or the like. In general, any water-miscible substantial non-solvent for carbohydrates may be used. Whereas prior processes use a preponderantly alcoholic aqueous solution with only a limited swelling of the particles taking place, I have found that free diffusion through the colloidal membrane does not take place until the particles are thoroughly hydrated, although not necessarily excessively distended, this condition obtaining with concentrations around 15 to 40%.

Further, I have discovered that the proportion of chopped moss to total solution is highly important to the most efficient operation of the invention inasmuch as it determines the range of osmotic pressures developing within the solution and thus influences the character of substances dialyzable through the colloid membrane. Thus, I have determined that at a concentration of 10 parts by weight or less of the dry moss to 100 parts of solution the most effective withdrawal of salts takes place with least removal of carbohydrate material, whereas in a concentration of say 30 parts of moss to 100 parts of solution the proportionate uptake of combustible impurities to salts may be entirely reversed. A solids concentration of between 5 and 20% is suitable in most cases.

By using unheated solutions of low alcoholic content I am enabled to selectively dissolve out the cold-water soluble carragheenic acid and its cleavage products without taking up any of the complex which is insoluble in cold water. By adjusting various factors above mentioned, I may operate within definite ranges of osmotic pressures and thus regulate the proportion of such cold water solubles to be withdrawn.

At the termination of the lixiviation period, the hydrated particles may be allowed to settle and the lixiviation liquor decanted, siphoned or centrifuged off and, if desired, transferred to a solvent recovery system. A washing of the hydrated particles, such as with a 30% isopropanol aqueous solution, may be practiced at this point to remove any adherent liquor and, if desired, the fluid may be recycled to the first stage operation for the succeeding batch without prior distillation or purification. The hydrated moss particles will now be found to have been substantially purged of their undesirable soluble impurities including, in addition to most of the coloring and aromatic matters, the free salts, acids and carbohydrate cleavage products contained in the unpurified material.

It now remains to remove the insoluble matters and any residual flavor, odor and color which were not completely removed in the steps preceding and the hydrated moss may now be dissolved in hot water to a solution and then filtered. For example, a large tank equipped with a high-speed agitator of the propeller type may be filled with water, preferably distilled, heated to about 160 to 200° F. and the wet moss particles fed into the whorl formed by the propeller until the solution contains approximately 2% of solids. Whereas the normal operation of dissolving chopped sea moss in hot water is very destructive of the active jellying principle, the prior removal of the catalytic salts and acids makes this step in my process relatively safe. Filtration may be accomplished in an ordinary pressure filter.

Finally, the filtered solution may be dried under vacuum. Although ordinary filtered extracts of sea moss when dried directly would be subjected to extensive destruction from the application of the drying heat in the presence of hydrolyzing impurities, the product which has been purified by my process may be successfully dried directly from its aqueous solution.

Drying may be aided and drier capacity substantially increased by subjecting the sea moss extract to a prior evaporation under vacuum. In practice it has been found feasible to carry the evaporation to approximately 4 percent sea moss solids, neutralizing the liquor if necessary to correct for any acidity developing during this operation. If an equivalent amount of sugar solids such as sucrose, dextrose, or lactose, be added to the extract prior to such evaporation, I have discovered that the evaporation may be carried to about 12 to 16 percent total solids (6–8 percent sea moss solids) with a great economy in drying cost resulting. The ratio of water to solids is thereby reduced from 50:1 to about 8:1. Apparently the sugar exercises a peptizing effect upon the colloid which permits it to be concentrated further without a proportionate loss of fluidity. The sugar to sea moss proportion of 1:1 is exemplary only and may be varied within certain obvious limits.

I have further discovered that by adding sugar solids to the extract prior to concentration, two further highly advantageous results are obtained: (1) the final dehydration may be carried closer to the point of absolute dryness; and (2) the final dried product is much more readily soluble in water.

Because of the inherent practical difficulties of drying the colloid substance alone without excessive discoloration or destruction of complex, it has been necessary to limit the operation to products containing 10–12 percent moisture or more. Such products have been exceedingly susceptible to deterioration in gel strength and viscosity on standing. In fact, a loss of 10 percent in viscosity in three months is considered about a minimum. The addition of sugar permits the extract to be dried to 2 or 3 percent of moisture or less, the sugar acting to protect the colloid both during the final stages of concentration and subsequently in the dehydrated state.

Discoloration of the product may be prevented by avoiding contact with iron during the processing operations.

The product may desirably be bleached by introducing about 2 percent or less of strong hydrogen peroxide solution (e. g., 100 volume) to the vacuum evaporated extract prior to the final drying. The viscosity and gelling characteristics of the product are not unfavorably affected by the addition and the residual hydrogen peroxide is decomposed and eliminated from the system during the final stage of drying.

The final stage of drying may preferably be accomplished by means of a vacuum drum drier.

The finished product comprises calcium carragheen sulfate and may or may not include a minor proportion of salts, cleavage and/or hydrolysis products depending upon how correctly and completely the various operations have been carried out and provided no breakdown of this compound has been permitted to occur during the final stages of the process. The product is substantially pure, stable, possesses a high degree of gelatinizing and stabilizing efficiency and because of its low cost of manufacture may be used extensively in food and industrial applications which are not now open to the present semi-purified washed products or costly alcohol-precipitated extracts.

It is understood that the process herein particularly described is exemplary only of the principles of the invention as defined in the following claims.

What I claim is:

1. The process of preparing a concentrate of the active gelatinizing principle of sea moss which comprises forming a lixiviation mixture of chopped sea moss and a cold 15 to 40% aqueous solution of lower aliphatic alcohol, the sea moss not exceeding substantially 20% of the mixture, maintaining said mixture for a sufficient time to permit substantially complete hydration of the sea moss and dialyzed separation of at least a substantial proportion of free salts and other soluble impurities therefrom, separating the treated sea moss material from the lixiviated liquid and contained solubles from the sea moss, dissolving the treated material in water to form a solution, separating insoluble matters and any residual flavor, odor and color from the solution and recovering the said concentrate from the resulting solution.

2. The process of preparing a concentrate of the active gelatinizing principle of sea moss which comprises forming a lixiviation mixture of about 10 parts washed chopped sea moss and about 100 parts of about a 30% aqueous solution of a lower aliphatic alcohol, maintaining said mixture for a sufficient time to permit substantially complete hydration of the sea moss and dialyzed separation of at least a substantial proportion of free salts and other soluble impurities therefrom, separating the treated sea moss material from the lixiviated liquid and contained solubles from the sea moss, dissolving the treated material in water to form a solution, separating insoluble matters and any residual flavor, odor and color from the solution and recovering the said concentrate from the resulting solution.

3. The process of preparing a concentrate of the active gelatinizing principle of sea moss which comprises forming a mixture of sea moss and a cold 15 to 40% alcohol aqueous solution, the sea moss not exceeding substantially 20% of the mixture, maintaining said mixture for a sufficient time to permit substantially complete hydration of the sea moss and dialyzed separation of at least a substantial proportion of free salts and other impurities therefrom, separating the resulting sea moss material from the mixture, and recovering the said concentrate from the separated material.

4. The process of preparing a concentrate of the active gelatinizing principle of sea moss which comprises forming a mixture of sea moss and a cold 15 to 40% alcohol aqueous solution, the sea moss not exceeding substantially 20% of the mixture, maintaining said mixture for a sufficient time to permit substantially complete hydration of the sea moss and dialyzed separation of at least a substantial proportion of free salts and other impurities therefrom, separating the resulting sea moss material from the mixture, removing insoluble matters and any residual flavor, odor and color from the separated sea moss material and drying the resulting sea moss material to recover the said concentrate.

5. A process as defined in claim 3 wherein the alcohol is a lower aliphatic alcohol.

6. A process as defined in claim 3 wherein the alcohol is isopropanol.

7. A process as defined in claim 3 wherein the mixture proportions are approximately 10 parts by weight of sea moss to 100 parts of aqueous solution.

ALBERT A. LUND.